US008500595B2

United States Patent
Kuzevanov et al.

(10) Patent No.: US 8,500,595 B2
(45) Date of Patent: Aug. 6, 2013

(54) DIFFERENTIAL ABIK FOR TRANSPORTATION MEANS

(75) Inventors: Viktor Mihailovich Kuzevanov, Chelyabinsk (RU); Gai Viktorovich Kuzevanov, Chelyabinsk (RU)

(73) Assignee: Gai Viktorovich Kuzevanov, Chelyabinsk (RU)

( * ) Notice: Subject to any disclaimer, the term of this patent is extended or adjusted under 35 U.S.C. 154(b) by 14 days.

(21) Appl. No.: 12/737,325

(22) PCT Filed: Nov. 2, 2009

(86) PCT No.: PCT/RU2009/000595
§ 371 (c)(1),
(2), (4) Date: Dec. 30, 2010

(87) PCT Pub. No.: WO2010/077173
PCT Pub. Date: Jul. 8, 2010

(65) Prior Publication Data
US 2011/0251012 A1 Oct. 13, 2011

(30) Foreign Application Priority Data
Dec. 31, 2008 (RU) .................................. 2008153037

(51) Int. Cl.
*F16H 48/06* (2006.01)
(52) U.S. Cl.
USPC ........................................................ 475/230
(58) Field of Classification Search
USPC ................. 475/174, 120, 220, 230, 231, 233, 475/236; 74/650
See application file for complete search history.

(56) References Cited

U.S. PATENT DOCUMENTS

| 2,092,128 | A * | 9/1937 | Lawler ........................... 475/174 |
| 6,398,689 | B1 * | 6/2002 | Morse et al. ................... 475/230 |
| 6,533,697 | B2 * | 3/2003 | Morse et al. ................... 475/230 |
| 2005/0070393 | A1 * | 3/2005 | DeGowske et al. ........... 475/220 |
| 2011/0165989 | A1 * | 7/2011 | Balenda et al. ............... 475/220 |

FOREIGN PATENT DOCUMENTS

| DE | 102006025058 | 12/2007 |
| RU | 2192972 | 11/2002 |
| RU | 2339859 | 11/2008 |
| WO | WO/2008/125814 | 10/2008 |

* cited by examiner

*Primary Examiner* — David D Le
*Assistant Examiner* — David J Hlavka
(74) *Attorney, Agent, or Firm* — Aleksandr Smushkovich

(57) ABSTRACT

The invention relates to differential drives for driving axles and wheels of transport means. The differential includes output shafts, which are kinematically interconnected by at least one differential pinion. The differential pinion is connected to the differential's housing by means of at least one intermediate member, which rotates freely in the housing coaxially to the geometrical axis of the differential pinion, and—conjugated surface zones of the differential pinion and the intermediate member, which zones are offset relative to the geometrical axis of the differential pinion. The conjugated surface zones may have different configurations. The invention makes it possible to simplify the design of a self-locking differential and to significantly increase the range of the blocking effect.

2 Claims, 3 Drawing Sheets

DIFFERENTIAL ABIK FOR TRANSPORTATION MEANS

CROSS-REFERENCE TO RELATED APPLICATIONS

This application is a U.S. national stage application of a PCT application PCT/RU2009/000595 filed on 2 Nov. 2009, published as WO2010077173, whose disclosure is incorporated herein in its entirety by reference, which PCT application claims priority of a Russian Federation application RU2008153037 filed on 31 Dec. 2008.

FIELD OF THE INVENTION

This invention relates to the field of multi-flow transmissions, in particular, to axle differentials for driving axles and wheels of transportation means.

There is known an arrangement of a cylindrical differential, wherein the middle differential pinions engaged with each other are of an elliptical form. During the relative rotation of half-axles and differential pinions, the transmission ratio in the range of one revolution of the elliptical differential pinion is variable. Such mechanisms with relative rotation of the half-axles periodically increase the traction torque on the lagging wheel (Lefarov A. H. "Differential gears of cars and prime movers", 1972. "Mashinostroenije", Moscow, page 101). The known differential with the differential pinions of elliptical form has a complicated design and a low blocking effect.

There is also known a bevel differential with a variable reduction ratio produced by Tikmen Co. (USA), which was selected as the nearest prior art analog. It comprises half-axle pinions (also called 'side gears') connected with each other by a tooth gearing with at least one differential pinion, which freely rotates on an axle, coaxial to the geometrical axis of the differential pinion, which axle is fixedly mounted inside the differential's housing. In that differential, the teeth of the tooth gearing are formed with a special profile. As a result, during the differential pinion's rotation around its axle, the torque arm of the differential pinion engaged with each side gear in the range of teeth's pitch is changeable. It increases by taking turns when engaged with the first side gear and decreases when engaged with the second side gear. This change causes variations of the force transmission ratio between the half-axles in the range of teeth's pitch (please also see the above mentioned Lefarov A. H. page 101).

The known structure of the conventional differential is complicated, because special additional equipment is required to manufacture a gear with a variable transmission ratio, in particular to manufacture its teeth of a special profile. The conventional differential also has a low blocking effect, as an increase of the torque arm with regard to that structure is possible only by the tooth's size.

AIM AND BRIEF DESCRIPTION OF THE INVENTION

The primary aim of the claimed invention is the designing a device deployable as a differential for transportation vehicles, which device will have a wide enough range of the blocking effect and will have a simple design. Other aims might become apparent to those skilled in the art upon learning the present disclosure.

The aforementioned aim has been achieved by providing the inventive design of a differential for a vehicle as follows below. The differential comprises: a housing; two output shafts rotationally mounted within the housing and kinematically associated with each other by means of at least one differential pinion having a geometrical axis of rotation; and means for joining the at least one differential pinion with the housing (herein also called an 'intermediate member'); wherein the aforesaid means for joining the at least one differential pinion with the housing are capable of free rotation within the housing coaxially with the aforesaid geometrical axis, wherein both the aforesaid means for joining the at least one differential pinion with the housing and the aforesaid at least one differential pinion include surface zones correspondingly conjugated with each other, and the surface zones are offset relatively to the aforesaid geometrical axis.

The desirable design simplification of the structure is attained due to the fact that the method for fabrication of the pinion gears used in the claimed differential is simple, well-tried, and does not require additional equipment therefor.

In the claimed differential, the blocking effect significantly increases due to the connection of the differential pinion with the housing through the at least one intermediate member freely rotating in the housing coaxially with the geometrical axis of the differential pinion, which intermediate member is kinematically associated with the differential pinion by means of surface zones, correspondingly conjugated with each other, which surface zones are offset relatively to the geometrical axis of the differential pinion. This is provided due to the aforementioned offset of the conjugated surface zone of the intermediate member and of the conjugated surface zone of the differential pinion, which, in turn, creates eccentricity that provides an opportunity to significantly change the torque arm.

The design of the claimed differential provides for a free movement of internal links of the differential during the application of an opposite-sign additional torque to one of the output shafts, but restricts rolling the internal links when one of the output shafts is stopped during the application of the same-sign torque. The increase of the blocking effect in the claimed differential is based on the change of distribution of the torque from the housing to the off-centered conjugated surface zones of the differential pinion and the intermediate member. The torque arm in the mesh of the side gears is variable due to the eccentricity; it increases, taking turns, when engaged with one side gear and decreases when engaged with the other one.

In a predetermined position of the conjugated surface zones relative to the housing, the torque, exerted by the housing through the intermediate member, resists to, the rotation of the differential pinion due to the displacement of the pressure point. When the vehicle is moving on the road with various engagement characteristics, the differential pinion of the claimed differential automatically takes up a position which provides a necessary difference of traction of the driving wheels and the movement without skidding.

The present invention is illustrated below with the detailed description of specifically designed embodiments with references to accompanying drawings.

DETAILED DESCRIPTION OF PREFERRED EMBODIMENT OF THE INVENTION

While the invention may be susceptible to embodiment in different forms, there are described in detail herein, specific embodiments of the present invention, with the understanding that the present disclosure is to be considered an exemplification of the principles of the invention, and is not intended to limit the invention to that as exemplified herein.

Figure 1:
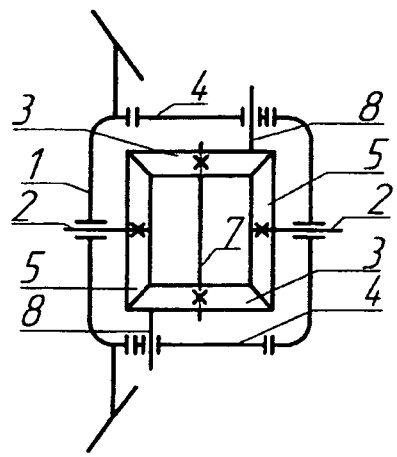
FIG. 1 illustrates a kinematic scheme of a bevel differential with offset conjugated surface zones, according to an embodiment of the present invention.
Figure 2:
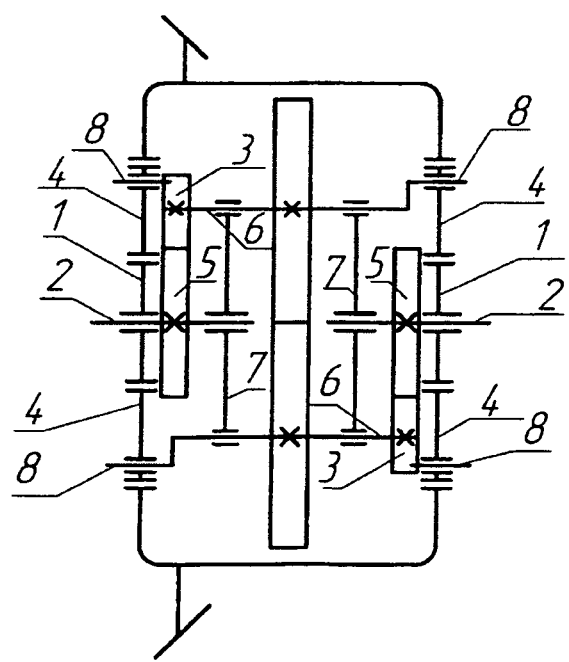
FIG. 2 illustrates a kinematic scheme of a cylindrical differential with offset conjugated surface zones, according to another embodiment of the present invention.
Figure 3:
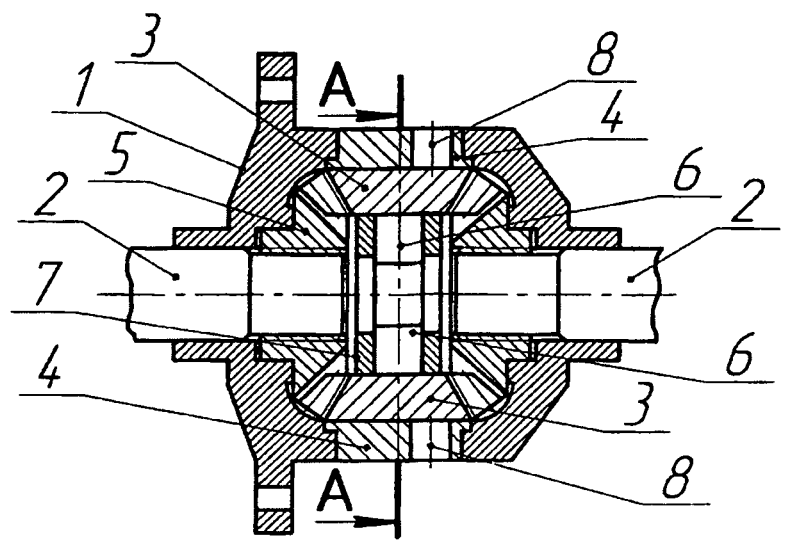
FIG. 3 illustrates a longitudinal section of the claimed differential in an embodiment, wherein the intermediate member is shaped as a bushing.
Figure 4:
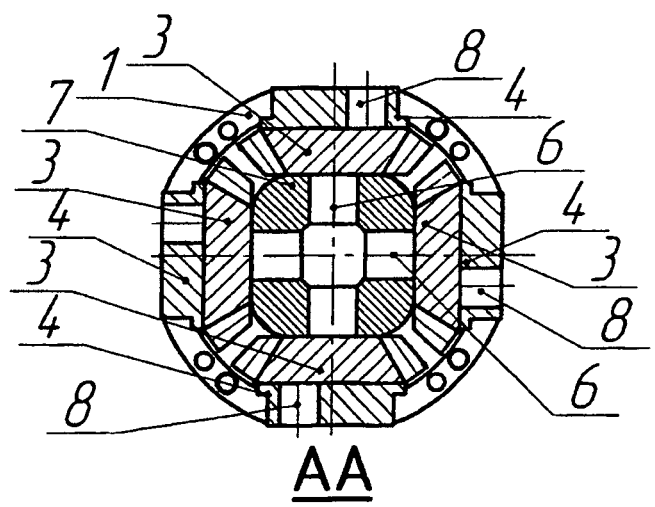
FIG. 4 is a sectional view of the A-A section of the claimed differential depicted on FIG. 3.
Figure 5:
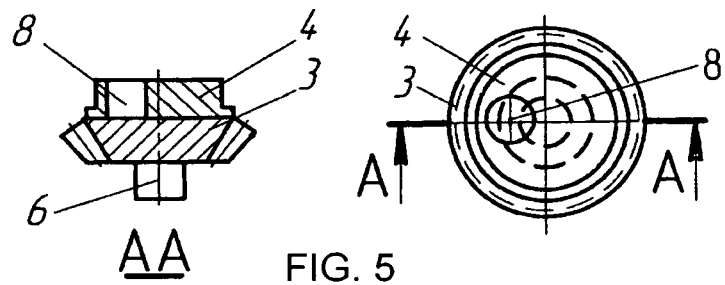
FIG. 5, 6, 7 illustrate design embodiments of the intermediate member in the kinematical connection with the differential pinion, wherein the intermediate member is shaped as a cylindrical surface (FIG. 5), a sector (FIG. 6), or a truncated cylinder (FIG. 7).
Figure 6:
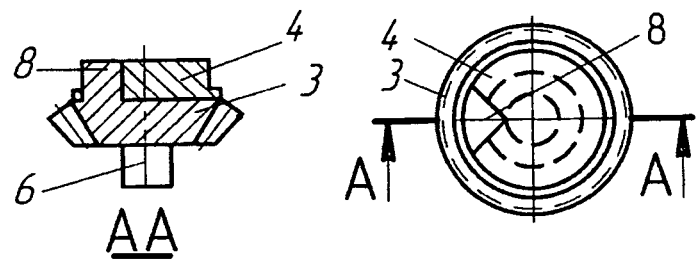
Figure 7:
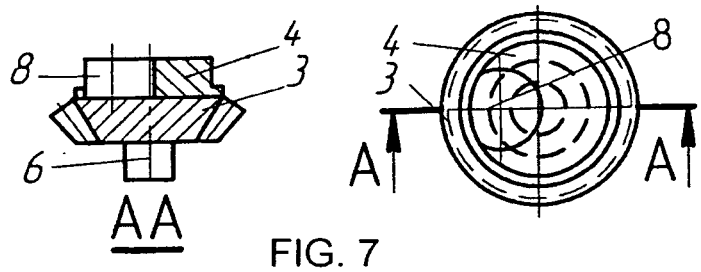

The claimed eccentric differential ABIK (which is an abbreviation for Automatic Blocking Invention of Kuzevanovs), in a preferred embodiment depicted on FIGS. 3, 4, comprises a housing 1, which includes two half-members that are heavily-bolted by means of centering pins (not illustrated). The housing 1 has two holes for output shafts 2 and four radial holes coaxial to the geometrical axis of differential pinions 3 (two pairs of such pinions 3 are exemplarily shown on FIGS. 3 and 4, wherein the pinions of one pair are situated in parallel planes). The differential further comprises four intermediate members, represented in this embodiment by four bushings 4, freely rotating within the four holes, wherein the degree of freedom for each bushing 4 is restricted from axial and radial displacements. The bushings 4 each has an internal opening, which is offset in relation to the geometrical axis of the corresponding differential pinion 3.

The output shafts 2 are fixedly attached to bevel side gears 5, interconnected with each other by the differential pinions 3; wherein each of the differential pinions 3 has an inner centralizing axle 6 coaxial to the geometrical axis of differential pinion 3, which inner axle 6 is inserted into an opening of a centralizing element 7 not connected with the housing 1. The differential further comprises an external axle 8, being part of the differential pinion 3 (FIGS. 3, 4); the external axle 8 is inserted into the aforesaid internal opening of bushing 4, i.e. the external axle 8 is also off-centered in relation to the geometrical axis of the corresponding differential pinion 3.

The inventive differential operates as follows. The distribution of torque from the housing 1 is carried out in the claimed differential through the intermediate member, in this example: the bushing 4. During a stoppage of one output shaft 2, the same-sign torque from the housing 1 is delivered through the bushing 4 to the external off-centered axle 8 of the differential pinion 3 and, depending on the position of the axle 8, a torque is originated that counteracts the rotation of the differential pinions 3.

During the origination of additional torque at one of the output shafts 2, for example, during the 'running ahead' wheels, when the vehicle turns, or when the vehicle bypasses an obstacle, the turning effort on the differential pinion 3 doubles and the differential pinion 3 rotates the bushing 4 via the axle 8, which effort is further transmitted to the housing 1 of the differential.

It is expedient to have four differential pinions in the differential to eliminate a displacement of the geometrical axis of the differential pinion 3 in relation to the geometrical axis of the intermediate member 4 that will be dependent on the circular orientation of the offset conjugated surface zones of the differential pinion 3 and the intermediate member 4 during the assembly of the differential.

Besides the bushing form, in other embodiments, the intermediate member can be differently configured, for example, as a truncated cone, a polyhedron, a bushing with a triangular equiaxed profile, etc. Such configuration should allow for rotation of the intermediate member inside the housing 1 coaxially to the geometrical axis of the differential pinion 3.

Besides the form of cylindrical axle, there can be various design embodiments of the conjugated surface zones for the intermediate member 4 and the differential pinion 3, for example, a notch-bulge in the form of a sector, a segment, an ellipse in a cylindrical opening, etc.

Figure 8:
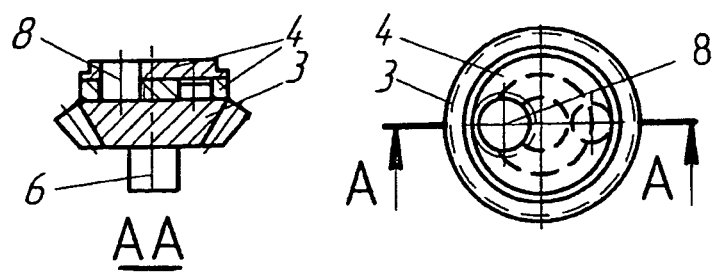
FIG. 8 illustrates design embodiments of the intermediate member shaped as a bushing.

FIG. 8 shows another embodiment of the inventive differential, wherein two intermediate members in the form of bushings 4 are employed.

There is another possible variant of centering the differential pinions 3, which have internal openings coaxial to the geometrical axis of the differential pinions 3, wherein the differential pinions 3 are conjugated with the centering element 7, made in the form of a crossarm, not connected with the housing 1.

The invention claimed is:

1. A differential gearing for a transportation means, said differential gearing comprises:
    a housing;
    two output shafts rotationally mounted within said housing and kinematically associated with each other by means of at least one differential pinion having a rotation geometrical axis, each said at least one differential pinion includes an external axle projecting therefrom and being part thereof;
    at least one intermediate member for joining said at least one differential pinion with the housing; each said at least one intermediate member includes an opening embracing said external axle and forming a kinematic pair therewith; each said opening and each said corresponding external axle have a common geometrical axis;
    wherein:
    said at least one intermediate member is capable of free rotation within the housing coaxially with said rotation geometrical axis of the corresponding at least one differential pinion; and
    said common geometrical axis is parallel to and spaced apart from the rotation geometrical axis of said at least one differential pinion.

2. The differential gearing according to claim 1, further comprising:
    two bevel side gears, each said bevel side gear is fixedly attached to one of said output shafts;
    a centralized element having four opening, said centralized element is disengaged from the housing;
    wherein:
    said at least one differential pinion is represented by two pairs of the differential pinions; each said differential pinion has an inner centralizing axle coaxial to said rotation geometrical axis of the corresponding differential pinion, each said inner centralizing axle is inserted into the corresponding opening of said centralizing element;
    said at least one intermediate member is represented by four bushings;
    said at least one opening is represented by four internal openings made in said corresponding bushings; and said at least one external axle is represented by four external axles.

* * * * *